United States Patent
Ning et al.

(10) Patent No.: US 9,773,084 B2
(45) Date of Patent: Sep. 26, 2017

(54) HEAT DISSIPATION SIMULATOR

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wan-Li Ning, Shenzhen (CN); Li-Ren Fu, Shenzhen (CN); Yu Han, Shenzhen (CN); Jun-Hui Wang, Shenzhen (CN); Al-Ling He, Shenzhen (CN); He Feng, Shenzhen (CN); Kun Li, Shenzhen (CN); Shu-Ni Yi, Shenzhen (CN); Lei Liu, Shenzhen (CN); An-Gang Liang, Shenzhen (CN); Ping-Chuan Deng, Shenzhen (CN); Ming-Yu Liu, Shenzhen (CN); Xia-Bing Gao, Shenzhen (CN); Han-Bing Zhang, Zhenzhen (CN); Zheng-Heng Sun, Ne Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 731 days.

(21) Appl. No.: 14/314,462

(22) Filed: Jun. 25, 2014

(65) Prior Publication Data
US 2015/0006139 A1 Jan. 1, 2015

(30) Foreign Application Priority Data
Jun. 26, 2013 (CN) .......................... 2013 1 0260192

(51) Int. Cl.
*G06F 17/50* (2006.01)

(52) U.S. Cl.
CPC ............................. *G06F 17/5068* (2013.01)

(58) Field of Classification Search
CPC ............................. G06F 17/5068; H05K 1/00
USPC ............................................. 703/14; 716/137
See application file for complete search history.

(56) References Cited

U.S. PATENT DOCUMENTS

| | | | | |
|---|---|---|---|---|
| 4,661,886 A * | 4/1987 | Nelson | ............... | H01L 23/04 257/729 |
| 4,884,337 A * | 12/1989 | Choinski | ............... | H05K 3/0094 156/155 |
| 6,138,892 A * | 10/2000 | Kim | ............... | B23K 1/0016 228/102 |
| 2004/0046249 A1* | 3/2004 | Bhattacharya | ........ | H01L 21/563 257/712 |
| 2006/0255479 A1* | 11/2006 | Kummerl | ............... | H01L 21/565 257/787 |
| 2008/0109773 A1* | 5/2008 | Douriet | ............... | G06F 17/5036 716/115 |
| 2009/0294429 A1* | 12/2009 | Chen | ........................ | H05B 3/26 219/200 |

(Continued)

*Primary Examiner* — Dwin M Craig
(74) *Attorney, Agent, or Firm* — Steven Reiss

(57) ABSTRACT

A heat dissipation simulator of a component on a printed circuit board (PCB) includes a simulation board and a simulated heat source. The simulation board includes an iron layer and a plastic layer. The simulated heat source includes a simulation chip, a thermal, and a heat sink. The simulation chip, the thermal piece, and the heat sink are mounted on the simulation board in that order. The heat dissipation simulator replaces a sample of the PCB with the component for simulating working states of the component on the PCB.

3 Claims, 3 Drawing Sheets

(56) References Cited

U.S. PATENT DOCUMENTS

2011/0085313 A1* 4/2011 Colbert .................. H05K 1/144
361/803

* cited by examiner

HEAT DISSIPATION SIMULATOR

FIELD

The subject matter herein generally relates to a heat dissipation simulator.

BACKGROUND

Heat generating components on a printed circuit board (PCB) need thermal characteristic tests for eligibility of heat dissipation.

BRIEF DESCRIPTION OF THE DRAWINGS

Implementations of the present technology will now be described, by way of example only, with reference to the attached figures.

DETAILED DESCRIPTION

Figure 1:
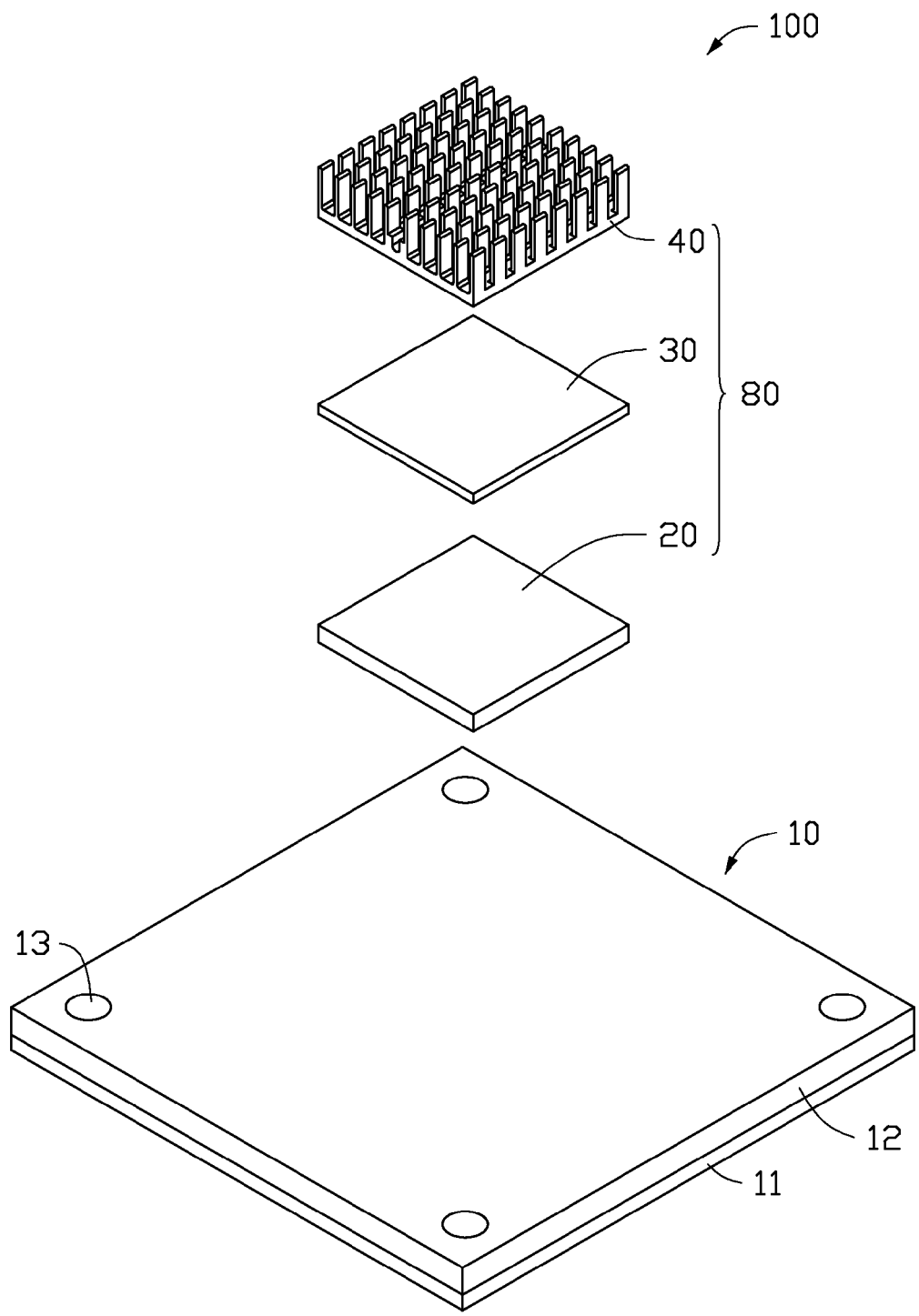
FIG. 1 is an exploded view of an exemplary embodiment of a heat dissipation simulator, and the heat dissipation simulator comprises a simulation chip.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a heat dissipation simulator 100 in a heat transfer test. The heat dissipation simulator 100 can simulate a heat dissipation of a PCB.

FIG. 1 illustrates an exploded exemplary embodiment of the heat dissipation simulator 100. In the embodiment, the heat dissipation simulator 100 can comprise a simulation board 10 and a plurality of simulated heat sources 80. Each of the simulated heat sources 80 can comprise a simulation chip 20, a thermal piece 30, and a heat sink 40. In at least one embodiment, the thermal piece 30 can be a resistor.

The simulation board 10 is substantially rectangular for simulating the PCB. A plurality of location holes 13 are defined in the simulation board 10. The simulation board 10 is fastened into a shell by a plurality of fasteners matching with the location holes 13. The simulation board 10 can comprise an iron layer 11 and a plastic layer 12.

Figure 2:
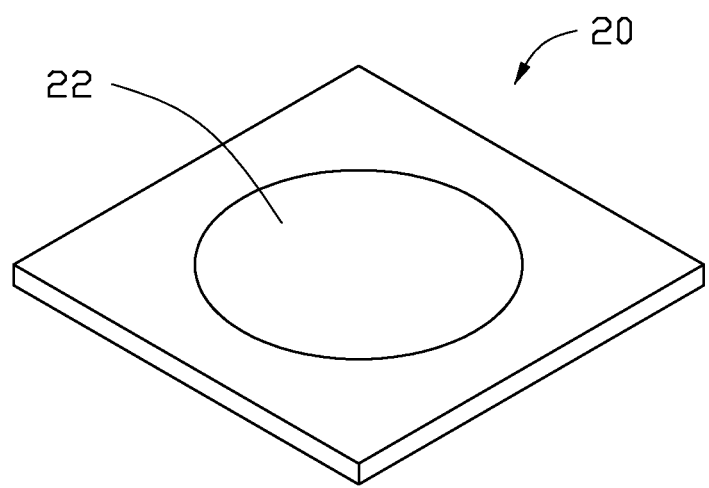
FIG. 2 is an enlarged view an exemplary embodiment of the simulation chip shown in FIG. 1.

FIG. 2 illustrates an exemplary embodiment of the simulation chip 20 simulating a component on the PCB. A magnet 22 is buried in a bottom of the simulation chip 20.

Figure 3:
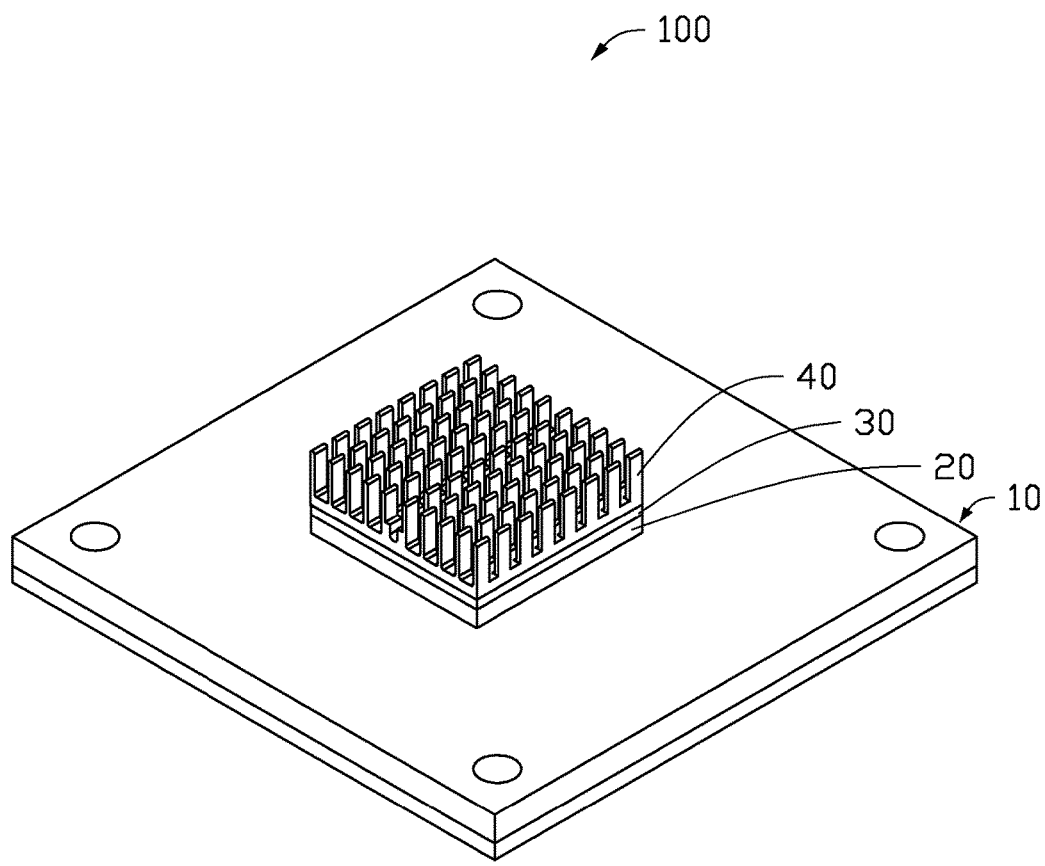
FIG. 3 is an assembled view of the heat dissipation simulator of FIG. 1.

FIG. 3 illustrates an exemplary embodiment of the heat dissipation simulator 100 as assembled. In assembly, the simulation chip 20 is mounted on the simulation board 10, by the magnet 22 in the simulation chip 20 attracting the iron layer 11 of the simulation board 10 separated by plastic layer 12. The thermal piece 30 and the heat sink 40 are mounted in that order on the simulation chip 20. The simulation board 10, comprises the simulation chip 20, the thermal piece 30, and the heat sink 40 mounted, is fastened into the shell by the location holes 13.

In operation, the thermal piece 30 is powered on and the thermal piece 30 generates heat for simulating working states of the component on the PCB, and the heat sink 40 dissipates the heat in the environment. Then a heat dissipation design can be obtained according to position of the simulation chip 20 mounted on the simulation board 10. If the heat dissipation design can satisfy a heat dissipation requirement of the PCB, the component on the PCB can be arranged according to the simulated states corresponding to the heat dissipation design. If the heat dissipation design cannot satisfy the heat dissipation requirement of the PCB, the position of the component must be changed in order to satisfy the heat dissipation requirement.

The heat dissipation simulator 100 can replace a sample of the PCB with the component, by simulating the component through the simulation chip 20, and by simulating solder with a magnet, for performing thermal characteristic tests.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A heat dissipation simulator configured to simulate a heat dissipation of a component on a printed circuit board, the heat dissipation simulator comprising:
    a simulation board comprising
        an iron layer; and
        a plastic layer; and
    a simulated heat source positioned and mounted on the simulation board, the simulated heat source comprising:
        a simulation chip configured to simulate the component, wherein a magnet is buried in a bottom of the simulation chip, wherein the simulation chip is mounted on the simulation board, base on the magnet attracts the iron layer of the simulation board separated by plastic layer;
        a thermal piece mounted on the simulation chip and configured to produce heat to simulate the heat of the component; and a heat sink mounted on the thermal piece and configured to dissipate the heat.

2. The heat dissipation simulator of claim 1, wherein a plurality of location holes, for fastening the simulation board, is defined on the simulation board.

3. The heat dissipation simulator of claim 1, wherein the thermal piece is a resistor.

* * * * *